No. 765,731. PATENTED JULY 26, 1904.
R. T. HOOTON & C. G. ROSS.
MACHINE FOR MEASURING CHOCOLATE.
APPLICATION FILED MAY 28, 1903.
NO MODEL. 2 SHEETS—SHEET 1.
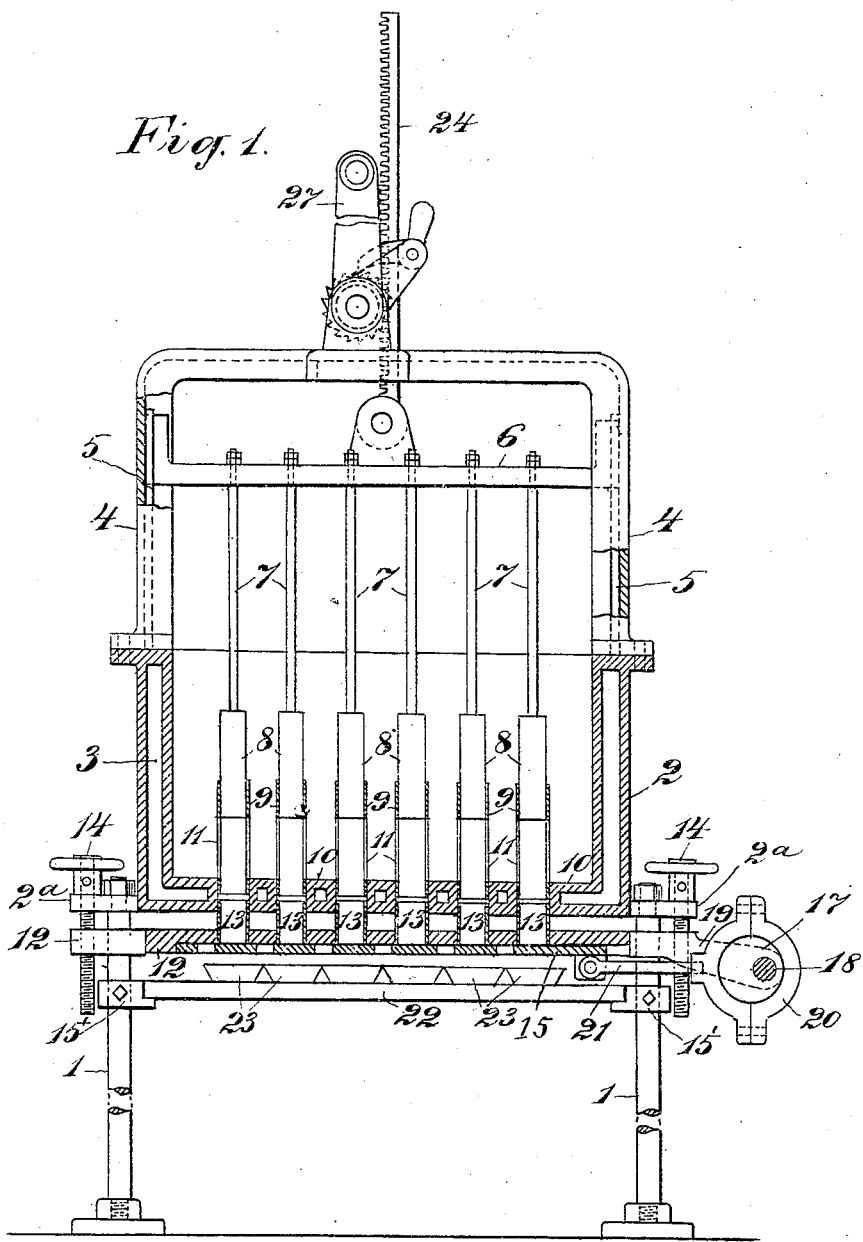

No. 765,731. PATENTED JULY 26, 1904.
R. T. HOOTON & C. G. ROSS.
MACHINE FOR MEASURING CHOCOLATE.
APPLICATION FILED MAY 28, 1903.
NO MODEL. 2 SHEETS—SHEET 2.
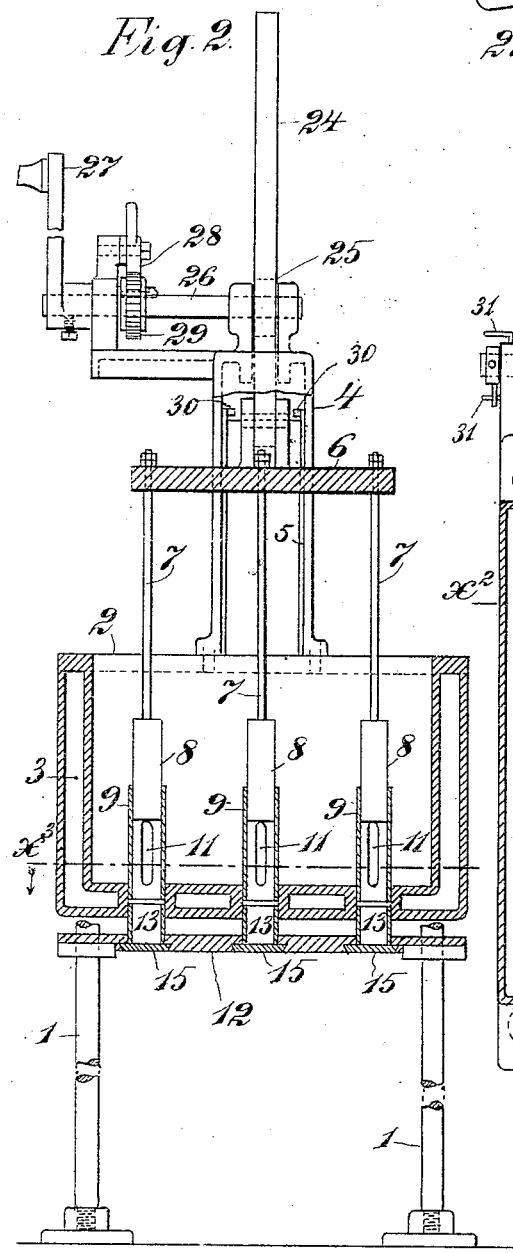
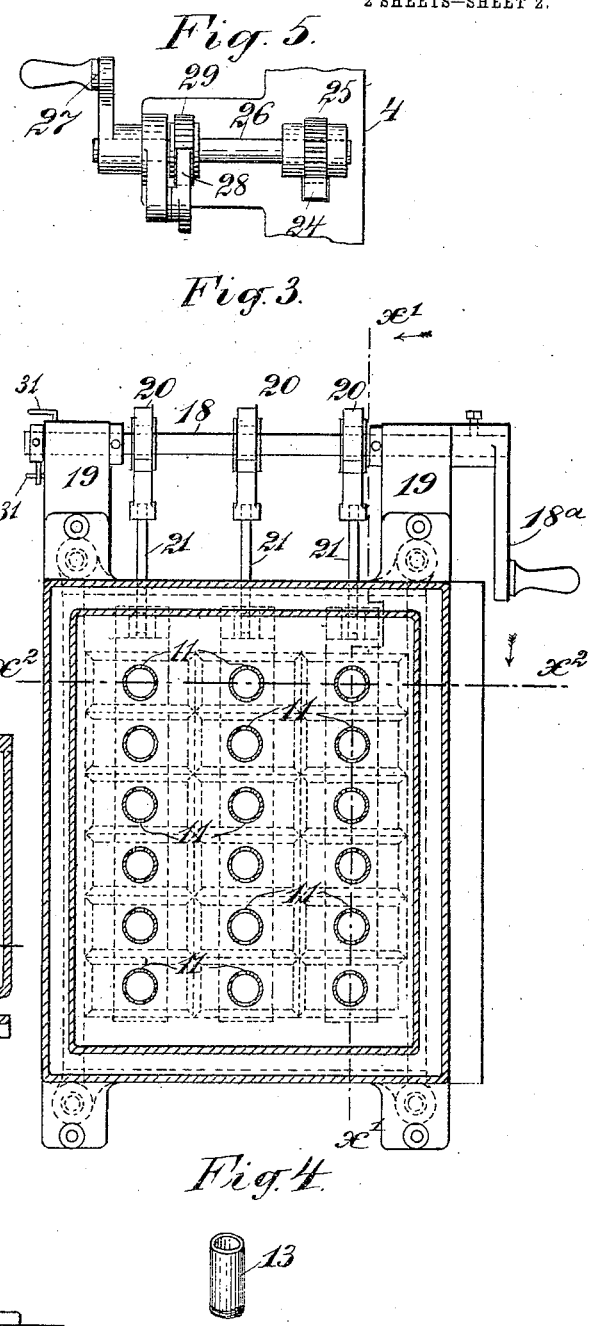
WITNESSES:
INVENTORS:
Robert T. Hooton
Charles G. Ross
BY
ATTORNEY No. 765,731. Patented July 26, 1904.

UNITED STATES PATENT OFFICE.

ROBERT T. HOOTON AND CHARLES G. ROSS, OF NEW YORK, N. Y.; SAID HOOTON ASSIGNOR TO SAID ROSS.

MACHINE FOR MEASURING CHOCOLATE.

SPECIFICATION forming part of Letters Patent No. 765,731, dated July 26, 1904.

Application filed May 28, 1903. Serial No. 159,070. (No model.)

*To all whom it may concern:*

Be it known that we, ROBERT T. HOOTON and CHARLES G. ROSS, citizens of the United States, residing in the borough of Brooklyn, in the county of Kings, in the city and State of New York, have jointly invented certain new and useful Improvements in Machines for Measuring Chocolate and the Like, of which the following is a specification.

This invention relates to the class of machines employed for measuring and delivering into molds fixed quantities of substances which are maintained in a liquid state by heat and become solid on cooling. For example, chocolate and chocolate compounds while in liquid state are measured into quantities of, say, a quarter of a pound or a half-pound in weight and put in molds to cool. As this is a comparatively costly substance and large quantities are made and sold by the manufacturer, it is obviously important to both the manufacturer and consumer that the cakes thus prepared should be of exactly the weight intended, and it is one important object of the present invention to produce a machine that will accurately and automatically measure each quantity of the substance delivered into the mold and one by which the quantity delivered may be adjusted in a moment with the greatest nicety.

Another object of the invention is to produce a machine that may be operated rapidly by unskilled labor.

In the drawings which illustrate our invention, Figure 1 is a sectional elevation of the machine at line $x'$ in Fig. 3. Fig. 2 is a sectional elevation of the machine at line $x^2$ in Fig. 3. The planes of the sections of Figs. 1 and 2 are taken at right angles. Fig. 3 is a horizontal section at line $x^3$ in Fig. 2. Fig. 4 is a view of the measuring-cylinders detached. Fig. 5 is a plan view of the gear mounted on the receptacle.

On suitable legs or uprights 1 is mounted a receptacle 2, having a jacket 3 to receive steam or hot water for keeping the contents of the receptacle warm or hot, as the case may be. On the receptacle 2 is mounted a suitable guide-frame 4, and in guides 5 in this frame is slidably mounted a cross-head 6, carrying plunger-rods 7, each bearing a plunger 8. Each plunger plays in a cylindrical guide 9, fixed by any suitable means in the bottom 10 of the receptacle. It will be noted that in the machine as illustrated there are eighteen of these plungers and guides disposed in three rows of six each; but the number of these devices is not important to the present invention. It is preferred to use this many or more in each machine for the sake of economy; but each such device or element of the eighteen elements shown is like all of the others and includes the novel features of this invention.

Each of the plunger-guides 9 has an aperture 11, one or more, in its side, and this aperture extends down to a level with the bottom 10, so that when the plungers are elevated the liquid substance contained in the receptacle 2 flows freely in under the plunger and down into a container or cell, which measures it. It will be noted by inspection of the drawings that the guide 9 fits in a hole or bore which extends through the bottom 10 of the receptacle and that below said bottom is mounted a supporting-plate 12, in which are holes wherein are secured relatively short measuring-cylinders 13, which extend up slidably into the said holes in the bottom 10 and are alined axially with the respective guides 9. The supporting-plate 12 is guided on the legs 1 and is made adjustable up and down thereon by upright screws 14, which have bearings in lugs or flanges $2^a$ on the receptacle 2 and screw through the plate 12. Slidably mounted in the plate 12 are three register-slides 15, one under each row of six of the measuring-cylinders 13 and having each six apertures so spaced as to be brought simultaneously into register with the holes in the plate 12, in which said cylinders are set, by drawing out the slide 15 to the proper extent. These three register-slides are moved in or out simultaneously by means of three eccentrics 17, fixed on a rock-shaft 18, mounted in bearings in brackets 19 on the plate 12. The straps 20 of the eccentrics are coupled by rods 21 to the respective register-slides.

Below the plate 12 and mounted so as to be adjustable up and down on the legs are blocks 15', supporting a shelf 22 to carry the molding-pans or molds 23, which receive the material.

Before explaining the operation of the machine it will be convenient to describe the mechanism by which the cross-head and plungers are raised and supported.

The cross-head 6 is suspended by a rack-bar 24, which is in gear with a pinion 25, fixed on a shaft 26, that is rotatively mounted in bearings on the frame 4 and is provided with a crank 27. By means of this crank, shaft, pinion, and rack the cross-head and plungers are elevated to the proper extent, and when so elevated they are supported by the engagement of a hinged pawl 28 with the teeth of a ratchet-wheel 29, fixed on the shaft 26.

Let us suppose the register-slides 15 are in position to close the bottoms of the measuring-cylinders 13 and the plungers are elevated and supported by the pawl and ratchet. The liquid substance in the receptacle will have flown into and filled the measuring-cylinders and of course filled in and about the guides 9 also. The workman now releases the pawl 28 from its engagement with the ratchet-wheel 29, and the weight of the cross-head and plungers causes these latter to descend by gravity to a level with the bottom 10 of the receptacle 2, thus incarcerating certain quantities of the liquid substance in the measuring-cells between the lower ends of the pistons and the register-slides, which form the bottoms for said cells. Then by means of a crank 18" on the shaft 18 he rotates the eccentrics 17 one-half way round. This has the effect to bring the apertures of the slide into register with the measuring-cylinders 13, and the liquid substance is free to flow out by gravity into the molds or pans 23 below. The plungers 8 now follow by gravity and descend in the cells to the slides 15, thus driving out all of the liquid substance therefrom. The workman now again rotates the eccentrics, so as to shift the slides 15 to their former position, elevates the plungers, and is ready for another operation. The filled molds or pans must, of course, be removed and empty ones substituted. Obviously by raising and lowering the plate 12 the depth of the measuring-cells will be varied and the quantities of the substance they will contain will be varied accordingly, and by means of the screws 14 this variation can be effected with the greatest accuracy and in a moment. The object is of course to produce a molded block or cake of the substance which will have exactly the required weight—say, for example, a quarter of a pound—and the contents of a cell may be ascertained approximately by calculation, the deficiency or excess being overcome by the adjustment described. Another advantage arises from this construction. Let it be supposed that the measuring-cylinders 13 are designed and proportioned to produce quarter-pound cakes and that we wish to use the machine for making half-pound cakes. In that case it is only necessary to have a set of measuring-cylinders (see Fig. 4) of about double the length of those shown in the principal views. The shorter cylinders are removed and the longer ones screwed fast in their places. Then the plate 12 is adjusted to suit the longer cylinders, and the work goes on in the same way, as before. The plungers descend by gravity, and the construction permits them to descend to the bottoms of the cells formed by longer cylinders.

The word "cylinder" is here used with respect to the guides 9 and measuring devices 13 merely in a descriptive sense. Obviously it is not material what shape they have in cross-section, and obviously also it is cheaper to make them cylindrical than with other forms.

The guides for the cross-head 6 may have stops 30 to limit the upward movements of the cross-head, and the shaft 18 may also have stops 31 to limit its movement to a half-rotation forward and back. Such stops may be arranged in various ways.

The word "liquid" as applied to the substance being molded is meant to apply to any substance sufficiently fluid to flow freely into the measuring-cells.

Having thus described our invention, we claim—

1. A machine for the purpose specified, comprising a receptacle for the liquid substance to be measured, said receptacle having a thick bottom with a cylindrical bore therethrough, a cylindrical plunger-guide in the receptacle, said guide being fixed upright in said bore and having in its side an aperture extending down to the bottom of the receptacle, a plunger in said guide and movable up and down therein, a measuring-cylinder of the same diameter internally as the piston-guide, the upper end of said cylinder fitting slidably in the bore in the bottom of the receptacle and its lower end being fixed to a vertically-movable supporting-plate, the said plate, means for adjusting it up and down, and a slidably movable bottom for said measuring-cylinder.

2. A machine for the purpose specified, comprising a receptacle for the liquid substance to be measured, said receptacle having a thick bottom with a cylindrical bore therethrough, a cylindrical plunger-guide in the receptacle, said guide being fixed upright in said bore and having in its side an aperture extending down to the bottom of the receptacle, a plunger in said guide and movable up and down therein, a measuring-cylinder of the same diameter internally as the piston-guide, the upper end of said cylinder fitting slidably in the bore in the bottom of the receptacle and its lower end being fixed to a vertically-movable supporting-plate, the said plate, means for adjusting it up and down, a slidably movable bottom for said measuring-cylinder, and means carried by said supporting-plate for operating said bottom.

3. A machine for the purpose specified, having a receptacle for the liquid substance to be measured, a suspended gravity-plunger therein, means for raising and supporting said plunger, an upright tubular guide for said plunger, said guide being fixed in an aperture in the bottom of the receptacle, a vertically-adjustable supporting-plate below the receptacle, screws for adjusting said plate, a measuring-cylinder fixed at its lower end in said plate and alined with the plunger, the upper end of said cylinder being slidable in the aperture in the bottom of the receptacle and forming an adjustable cell for measuring, a register-slide mounted in the supporting-plate for closing the cell, and means carried by said plate for operating said slide.

In witness whereof we have hereunto signed our names in the presence of two subscribing witnesses.

ROBERT T. HOOTON.
CHAS. G. ROSS.

Witnesses:
H. A. CONNETT,
WILLIAM J. FIRTH.